(12) United States Patent
Hsia et al.

(10) Patent No.: US 8,267,069 B2
(45) Date of Patent: Sep. 18, 2012

(54) EMG TEMP SIGNAL MODEL BASED ON EGRC OUT TEMP FOR EGR SYSTEM ANTI-FOULING PROTECTION

(75) Inventors: David M. Hsia, Bartlett, IL (US);
Rogelio Rodriguez, Plainfield, IL (US);
Chethana Bhasham, Lisle, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 444 days.

(21) Appl. No.: 12/546,975

(22) Filed: Aug. 25, 2009

(65) Prior Publication Data

US 2011/0048389 A1    Mar. 3, 2011

(51) Int. Cl.
*F02M 25/06* (2006.01)
*F02B 47/08* (2006.01)

(52) U.S. Cl. ......... 123/568.12; 123/568.11; 123/568.21; 701/108; 60/278

(58) Field of Classification Search .............. 123/568.16, 123/568.17, 568.18, 568.21, 568.12, 568.11, 123/568.23, 568.26, 568.31; 701/108; 60/278, 60/605.2, 279
See application file for complete search history.

(56) References Cited

U.S. PATENT DOCUMENTS

| | | | | |
|---|---|---|---|---|
| 4,147,141 A * | 4/1979 | Nagano | ...................... | 123/568.12 |
| 5,617,726 A * | 4/1997 | Sheridan et al. | .............. | 60/605.2 |
| 6,085,732 A * | 7/2000 | Wang et al. | .............. | 123/568.12 |
| 6,367,256 B1 * | 4/2002 | McKee | ........................ | 60/605.2 |
| 6,434,476 B1 * | 8/2002 | Zagone | .......................... | 701/115 |
| 6,681,171 B2 * | 1/2004 | Rimnac et al. | ................ | 701/108 |
| 6,725,847 B2 * | 4/2004 | Brunemann et al. | ..... | 123/568.12 |
| 6,904,898 B1 * | 6/2005 | Sahlen | ........................ | 123/568.12 |
| 6,934,621 B2 * | 8/2005 | Bhargava et al. | ............. | 701/108 |
| 7,089,738 B1 * | 8/2006 | Boewe et al. | ............... | 60/605.2 |
| 7,131,271 B2 | 11/2006 | Bulicz | | |
| 7,210,469 B1 | 5/2007 | Saele | | |
| 7,281,529 B2 | 10/2007 | Lew | | |
| 7,284,544 B2 * | 10/2007 | Hatano | ..................... | 123/568.12 |
| 7,363,919 B1 * | 4/2008 | Styles | ....................... | 123/568.12 |
| 8,028,569 B2 * | 10/2011 | Blumendeller et al. | ... | 73/114.74 |
| 8,037,737 B2 * | 10/2011 | Recouvreur et al. | ......... | 73/23.31 |
| 8,047,184 B2 * | 11/2011 | Styles et al. | ............. | 123/568.12 |
| 2006/0112679 A1 * | 6/2006 | Kojima et al. | ................... | 60/278 |

* cited by examiner

*Primary Examiner* — Stephen K Cronin
*Assistant Examiner* — Raza Najmuddin
(74) *Attorney, Agent, or Firm* — Jeffrey P. Calfa; Mark C. Bach

(57) ABSTRACT

An EGR control method to prevent condensation within the EGR system uses a temperature sensor signal from an EGR cooler exhaust gas outlet to model or estimate exhaust manifold gas temperature upstream of the cooler. If the estimated exhaust manifold gas temperature falls below a predetermined level, the engine control system closes or partially closes the EGR control valve to stop EGR flow through the cooler and the EGR valve.

6 Claims, 2 Drawing Sheets

EMG TEMP SIGNAL MODEL BASED ON EGRC OUT TEMP FOR EGR SYSTEM ANTI-FOULING PROTECTION

FIELD OF THE INVENTION

This invention relates to internal combustion engines, including but not limited to engines having cooled exhaust gas recirculation (EGR).

BACKGROUND OF THE INVENTION

Internal combustion engines, especially compression ignition engines such as diesel engines, utilize EGR to reduce emissions. An EGR system typically includes a flow circuit between the engine exhaust system and the engine intake system with an EGR cooler and an EGR valve within the flow circuit. EGR coolers are heat exchangers that typically use engine coolant to cool exhaust gas being recirculated into the intake system of the engine. Engine exhaust gas typically includes combustion by-products, such as unburned fuel, many types of hydrocarbon compounds, sulfur compounds, water, and so forth.

Various compounds may condense and deposit on interior surfaces of engine components when exhaust gas is cooled. The EGR cooler and the EGR valve are prone to condensation of compounds in the exhaust gas passing through it. The condensation is especially evident during cold ambient conditions, low exhaust gas temperatures, and/or low exhaust gas flow rates through the EGR cooler such as during idling. In some systems, in order to mitigate fouling of the EGR system components, the EGR valve is commanded to close by the Engine Control Unit (ECU) after sensing extended engine idling.

Condensation inside the EGR cooler, or fouling, decreases the percent-effectiveness of the EGR cooler. EGR coolers are designed to cope with condensation of hydrocarbons by incorporating anti-fouling features, such as appropriate geometries that inhibit excessive accumulation of condensates and a designed-in extra capacity that is intended to be lost to fouling during service of the cooler.

The incorporation of anti-fouling features, and the increased size of EGR coolers make cooler design complicated and costly. Accordingly, the present inventors have recognized that there is a need for an EGR system having an EGR cooler that is able to maintain higher efficiency without requiring complicated anti-fouling mechanisms or an increased cooler size.

The present inventors have recognized that there is a need to provide an EGR system with reduced fouling due to hydrocarbon condensation at low exhaust manifold gas temperatures.

SUMMARY

An exemplary method of the invention uses a temperature sensor signal from an EGR cooler exhaust gas outlet to model or estimate exhaust manifold gas temperature to more effectively reduce EGR system component fouling by protecting the EGR system from the condensation of hydrocarbons under certain engine operating conditions. The exemplary method allows for the use of a pre-existing temperature sensor downstream of the EGR cooler operating at a lower temperature to calculate the exhaust gas manifold temperature upstream of the cooler.

An exemplary embodiment of the invention utilizes the engine electronic control unit (ECU) to process a temperature sensor signal from the EGR cooler exhaust gas outlet, then the engine control unit computes a model-based exhaust manifold gas temperature value, and then commands the EGR valve to go to the closed position.

Alternatively, an inferred or estimated exhaust manifold gas temperature can be calculated utilizing the temperature sensor signal from the EGR cooler exhaust gas outlet along with various engine control system parameters to develop a correlation relationship.

Preferably, the engine electronic control unit processes the temperature sensor signal from the EGR cooler exhaust gas outlet, then the ECU computes a model-based exhaust manifold gas temperature value, then the ECU uses a lookup table to determine when exhaust manifold gas temperature is low enough to cause hydrocarbon condensation, and then the algorithm commands the EGR valve to go to a closed or partially closed position, which should prevent EGR valve fouling.

In addition, engine application-specific entry conditions can be monitored to allow the EGR valve to be commanded off. These application-specific entry conditions indicate when engine is running at low speed and light loads, during which exhaust gas temperature is expected to be low enough for hydrocarbon condensation.

Numerous other advantages and features of the present invention will be become readily apparent from the following detailed description of the invention and the embodiments thereof, from the claims and from the accompanying drawings.

DETAILED DESCRIPTION

Figure 1:
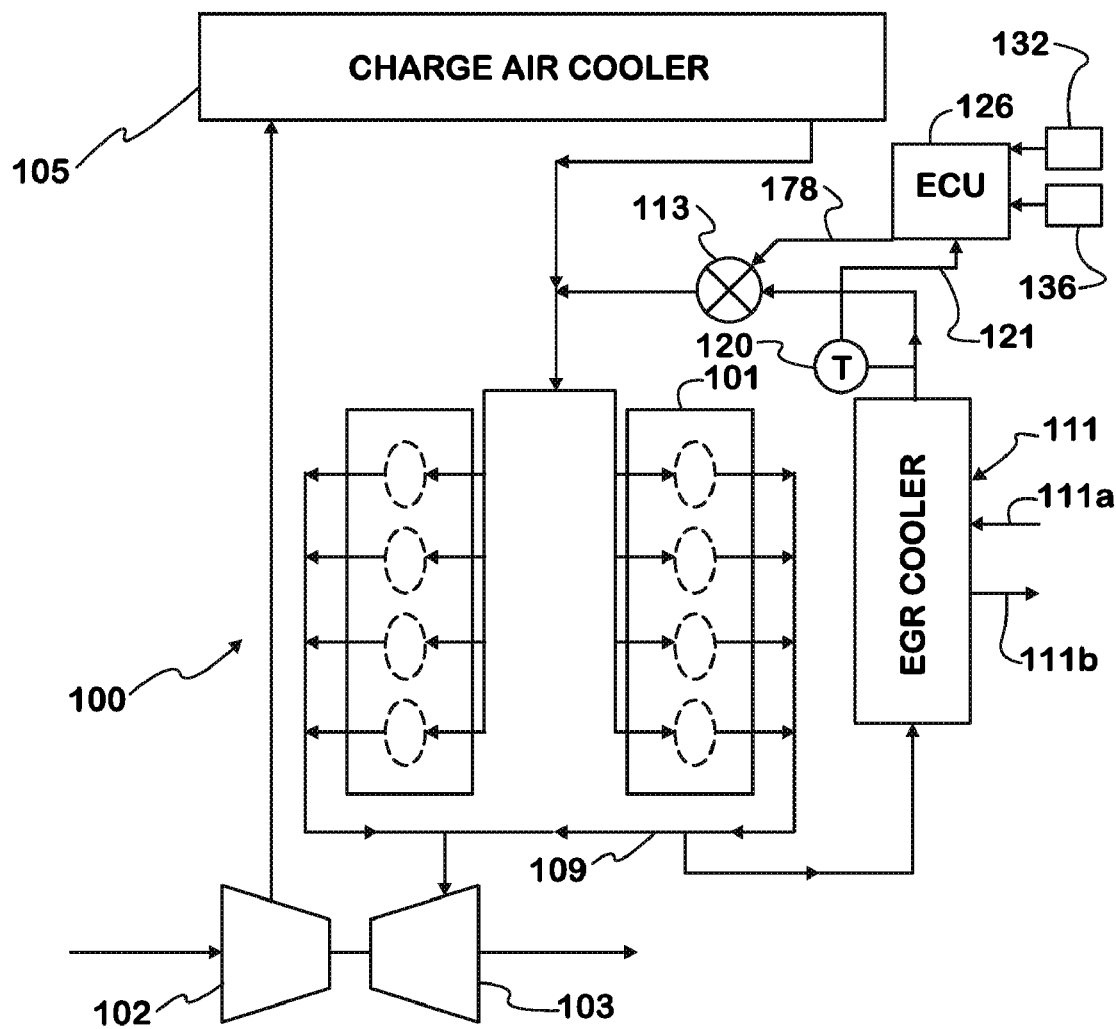
FIG. 1 is a schematic diagram of an internal combustion engine having an EGR system.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

The following describes an apparatus for and method of operating an EGR valve for an internal combustion engine. The engine includes an EGR system having an EGR cooler fluidly communicating with the engine. A block diagram of an engine having a high-pressure EGR system is shown in FIG. 1. Other EGR circuits are shown in U.S. Pat. No. 7,281,529, herein incorporated by reference.

A base engine 100 contains a plurality of cylinders housed in an engine block 101. A compressor 102 is connected to an air cleaner (not shown) and a turbine 103. An outlet of the compressor 101 is connected to a charge cooler 105, which in turn is connected to an intake system 117. The turbine 103 is connected to an exhaust system 109. The exhaust system 109 is connected to the engine block 101, and also connected to an EGR cooler 111. The EGR cooler 111 is connected to an EGR valve 113.

The EGR cooler 111 includes a housing and a heat transfer structure within the housing, such as a tube bundle or passages, that separate engine coolant from exhaust gas but allow heat transfer between the engine coolant and exhaust gas within the housing. A coolant inlet 111a and an outlet 111b direct coolant through the heat transfer structure.

During engine operation, air from the air cleaner (not shown) enters the compressor 102. Exhaust gas from the engine block 101 enters the exhaust system 109. A portion of the exhaust gas in the exhaust system 109 operates the turbine 103, and a portion enters the EGR cooler 111. The exhaust gas entering the turbine 103 forces a turbine wheel (not shown) to rotate and provide power to a compressor wheel (not shown) that compresses air. The compressed air travels from the output of the compressor 102 to the charge air cooler 105 where it is cooled. The cooled compressed air is then ingested by the engine through the intake system 117.

Exhaust gas entering the EGR cooler 111 is cooled before entering the EGR valve 113. The EGR valve 113 is shown downstream of the EGR cooler 111, but may alternatively be positioned upstream of the EGR cooler 111. The EGR valve 113 controls the quantity of exhaust gas the engine 100 will ingest. The exhaust gas exiting the EGR valve 113 mixes with the compressed and cooled air coming from the charge cooler 105 upstream of the intake system 117.

A temperature sensor 120 generates a signal 121 representative of the temperature of the exhaust gas exiting the cooler 111. This signal 121 is sent to the engine electronic control unit (ECU) 126. The ECU 126 typically monitors and controls the operation of the engine, such as the timing and operation of the fuel injectors, the operation of the EGR valve and other engine controls. The ECU 126 normally controls the percentage open or closed of the EGR valve 113 depending on the engine parameters, to control exhaust emissions.

In heretofore known EGR control schemes, the position of the EGR valve which determines the amount of EGR during steady state engine operation is controlled by a variety of factors but predominantly engine speed and indicated torque. When the accelerator is depressed or released, a changed amount of fuel is delivered into the engine. For reducing emissions and for maintaining engine efficiency, the engine control sets a mass air flow rate and the EGR valve is adjusted according to the pre-set relationship programmed into the control, such as described in U.S. published application 2008/0078176.

In this regard, many engine parameters are input into the ECU 126 such as described in U.S. published patent application 2008/0078176 or U.S. Pat. Nos. 7,353,648; 6,973,382 or 6,401,700 all herein incorporated by reference.

Three parameters that are useful in the exemplary method of the present invention are the sensed temperature signal 121, an engine coolant temperature signal 132 and an EGR flow rate signal 136. The engine coolant temperature signal can be taken at the inlet 111a or upstream of the cooler. The EGR flow rate can be measured or calculated by the ECU 126 based on the percentage open of the EGR control valve 113 and/or other engine parameters. The mass flow rate of EGR gas can be measured by the EGR valve position and pressure drop across the valve. Alternately, the mass flow rate of EGR can be determined by the calculated difference between the total mass air flow through the engine calculated by the ECU 126 using the engine displacement and the RPM, and the mass flow of fresh air from the engine MAF sensor.

According to the exemplary method, sensed temperature signal 121 from the sensor 120, an engine coolant temperature signal 132, and an EGR mass flow rate 136 are used to cause the ECU 126 to close the EGR valve to stop EGR flow and prevent fouling of the EGR system under certain engine operating conditions.

Figure 2:
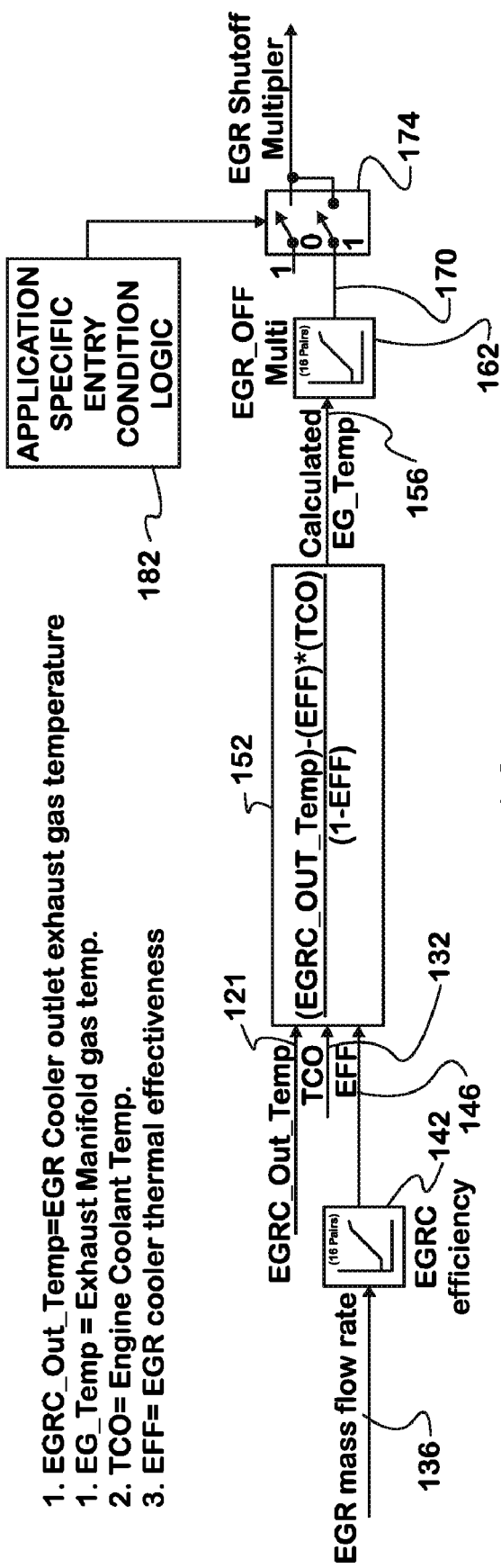
FIG. 2 is signal diagram of a control scheme for operating the EGR system described in FIG. 1.

As demonstrated in FIG. 2, the EGR mass flow rate 136 is input into an EGR cooler efficiency calculation module or look up table module 142 within the ECU 126. Based on the EGR mass flow rate, and known heat transfer characteristics of the particular cooler, i.e., the heat transfer structure, an EGR cooler efficiency parameter 146 is generated.

The temperature signal 121 from the sensor 120, the engine coolant temperature signal 132 and the efficiency parameter 146 are input into a calculation module 152 within the ECU 126, wherein the module does the calculation:

$$\frac{(EGRC\_OUT\_Temp) - (EFF) * (TCO)}{(1 - EFF)},$$

or stated another way, $$\frac{(signal\ 121) - ((signal\ 146) * (signal\ 132))}{(1 - signal\ 146)}$$

generates an estimated exhaust manifold exhaust gas temperature 156.

The estimated exhaust manifold exhaust gas temperature 156 is communicated to EGR valve signal generator module 162 within the ECU 126 that, depending on the estimated exhaust manifold gas temperature 156, generates a shutoff signal 170 sufficient to close or partially close the EGR valve. The shutoff signal 170 is communicated through a logic switch 174 within the ECU 126 that passes the signal as an EGR shutoff signal 178 to the EGR valve 113.

In addition to the signal 170, the logic switch can receive a shutoff signal 182 from application specific entry conditions from a control module 184 within the ECU 126. Different applications may have different conditions which would dictate that the valve be closed once the conditions are met. If the conditions would require the EGR to be shut off immediately, then the input selection signal 182 would go to zero. An example would be if load demand suddenly goes from low to high, EGR would be shut off. Another example would be if one of the engine sensors reports a fault that would cause the model to be inaccurate or non-operational, then the EGR would be shut off.

The modules 142, 152, 162, 174, 184 within the ECU 126 can be pre-programmed into an existing ECU 126 or can be one or more electronic processor chips, programmable logic controllers, logic processors, memory circuits, RAMs, ROMs, electronic chips, and or microprocessors.

Once the EGR valve is closed the ECU 126 continues to monitor the various engine parameters, and once the conditions are met to allow EGR flow, the EGR valve is commanded to open and resume responding to normal operational commands from the ECU 126. For example responding to engine speed and indicated torque.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method of controlling an EGR valve of an exhaust gas system for an engine, having an exhaust manifold and an intake manifold, an EGR flow path between the exhaust manifold and the intake manifold, the EGR flow path having an EGR exhaust gas cooler cooled by engine coolant and the EGR control valve controlled by an engine electronic control unit, the EGR control valve in series with and downstream of the EGR gas cooler comprising the steps of:

establishing a low temperature setpoint;
providing an EGR temperature sensor downstream of the cooler;
monitoring sensed temperature of the exhaust gas from the EGR temperature sensor;
monitoring engine coolant temperature;
monitoring exhaust gas flow rate through the EGR cooler;
estimating an upstream exhaust gas temperature upstream of the EGR cooler using the sensed temperature from the EGR temperature sensor, heat transfer characteristics of the EGR cooler, the engine coolant temperature, and the exhaust gas flow rate through the EGR cooler; and
if the upstream exhaust gas temperature is below the low temperature setpoint at least partially closing the EGR control valve.

2. The method according to claim 1, wherein the step of estimating comprises calculating a heat transfer efficiency of the cooler based on the heat transfer characteristics of the cooler and the exhaust gas flow rate through the EGR cooler.

3. The method according to claim 2, wherein the step of estimating an upstream exhaust gas temperature comprises calculating upstream exhaust gas temperatures based on the sensed temperature of the EGR temperature sensor, the heat transfer efficiency and the engine coolant temperature.

4. A method of controlling an EGR valve of a diesel engine having an exhaust gas system having an exhaust manifold and an intake manifold, an EGR flow path between the exhaust manifold and the intake manifold, the EGR flow path having an EGR exhaust gas cooler cooled by engine coolant, and the EGR control valve controlled by an engine electronic control unit, the EGR control valve in series with and downstream of the cooler, comprising the steps of:
establishing a low exhaust manifold temperature setpoint;
monitoring sensed temperature of the exhaust gas downstream of the EGR cooler from the EGR temperature sensor;
monitoring engine coolant temperature;
determining exhaust gas flow rate through the EGR cooler;
estimating an upstream exhaust gas temperature upstream of the EGR cooler using the sensed temperature from the EGR temperature sensor, heat transfer characteristics of the EGR cooler, the engine coolant temperature, and the exhaust gas flow rate through the EGR cooler;
if the upstream exhaust gas temperature is below the low temperature setpoint at least partially closing the EGR control valve.

5. The method according to claim 4, wherein the step of estimating comprises calculating a heat transfer efficiency of the cooler based on the heat transfer characteristics of the cooler and the exhaust gas flow rate through the EGR cooler.

6. The method according to claim 5, wherein the step of estimating an upstream exhaust gas temperature comprises calculating upstream exhaust gas temperatures based on the sensed temperature of the EGR temperature sensor, the heat transfer efficiency and the engine coolant temperature.

* * * * *